(12) United States Patent
Hazlewood et al.

(10) Patent No.: US 7,677,594 B2
(45) Date of Patent: Mar. 16, 2010

(54) VEHICLE SEAT HAVING A SIDE AIRBAG DEPLOYMENT STRAP

(75) Inventors: Robert Joseph Hazlewood, Plymouth, MI (US); Todd P. Lang, Plymouth, MI (US); Jeffrey W. Sosnowski, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 222 days.

(21) Appl. No.: 11/771,508

(22) Filed: Jun. 29, 2007

(65) Prior Publication Data

US 2009/0001783 A1    Jan. 1, 2009

(51) Int. Cl.
*B60R 21/207* (2006.01)
(52) U.S. Cl. ............... 280/728.2; 297/216.1; 280/730.2
(58) Field of Classification Search ............. 280/730.2, 280/728.2, 728.3; 297/216.1
See application file for complete search history.

(56) References Cited

U.S. PATENT DOCUMENTS

| | | | |
|---|---|---|---|
| 5,630,615 A * | 5/1997 | Miesik | 280/730.2 |
| 5,749,597 A * | 5/1998 | Saderholm | 280/728.2 |
| 5,810,389 A | 9/1998 | Yamaji et al. | |
| 5,860,673 A | 1/1999 | Hasegawa et al. | |
| 5,893,579 A * | 4/1999 | Kimura et al. | 280/730.2 |
| 5,927,749 A * | 7/1999 | Homier et al. | 280/730.2 |
| 5,938,232 A * | 8/1999 | Kalandek et al. | 280/730.2 |
| 5,967,603 A * | 10/1999 | Genders et al. | 297/216.13 |
| 5,988,674 A * | 11/1999 | Kimura et al. | 280/730.2 |
| 6,003,939 A * | 12/1999 | Nakai et al. | 297/216.13 |
| 6,045,151 A * | 4/2000 | Wu | 280/728.3 |
| 6,074,003 A * | 6/2000 | Umezawa et al. | 297/216.1 |
| 6,095,602 A * | 8/2000 | Umezawa et al. | 297/216.1 |
| 6,213,498 B1 * | 4/2001 | Ghalambor et al. | 280/730.2 |
| 6,352,304 B1 * | 3/2002 | Sorgenfrei | 297/216.13 |

(Continued)

FOREIGN PATENT DOCUMENTS

JP        09123860        5/1997

(Continued)

*Primary Examiner*—Paul N. Dickson
*Assistant Examiner*—Timothy Wilhelm
(74) *Attorney, Agent, or Firm*—Gifford, Krass, Sprinkle, Anderson & Citkowski, P.C.

(57) ABSTRACT

A seat assembly for supporting an occupant in a passenger compartment of an automotive vehicle. The seat assembly includes a seat back for supporting the back of the occupant. The seat back includes an airbag module, a frame, a trim cover and a plurality of straps connecting the trim cover to the frame. The airbag module has an inflatable airbag. The trim cover covers the airbag module, foam pad and frame. The trim cover has a first seam through which the airbag can deploy during operation of the airbag module. The trim cover has a second seam spaced apart from the first seam. The plurality of straps prevent stretching of the trim cover during deployment of the airbag and direct the energy associated with the deployment of the airbag toward the first seam. First and second straps of the plurality of straps each have a first end fixedly secured to the trim cover along the first seam and a second end fixedly secured to the frame. The airbag module is disposed the first and second straps. A third strap of the plurality of straps has a first end fixedly secured to the trim cover along the second seam and a second end fixedly secured to the frame.

10 Claims, 2 Drawing Sheets

U.S. PATENT DOCUMENTS

| | | | |
|---|---|---|---|
| 6,357,789 B1 * | 3/2002 | Harada et al. | 280/730.2 |
| 6,386,577 B1 * | 5/2002 | Kan et al. | 280/730.2 |
| 6,439,597 B1 * | 8/2002 | Harada et al. | 280/728.2 |
| 6,450,528 B1 * | 9/2002 | Suezawa et al. | 280/730.2 |
| 6,457,741 B2 * | 10/2002 | Seki et al. | 280/730.2 |
| 6,578,911 B2 * | 6/2003 | Harada et al. | 297/216.13 |
| 6,588,838 B1 * | 7/2003 | Dick et al. | 297/216.13 |
| 7,134,685 B2 * | 11/2006 | Panagos et al. | 280/730.2 |
| 7,232,150 B2 * | 6/2007 | Nagayama | 280/730.2 |

FOREIGN PATENT DOCUMENTS

| | | |
|---|---|---|
| JP | 2001010439 | 1/2001 |
| JP | 2006143214 | 6/2006 |

* cited by examiner

VEHICLE SEAT HAVING A SIDE AIRBAG DEPLOYMENT STRAP

FIELD OF THE INVENTION

The invention relates to an automotive vehicle seat assembly having a side impact airbag. More particularly, the invention relates to a plurality of straps each extending between a trim cover and a frame of the seat assembly to facilitate deployment of the airbag through a seam formed in the trim cover.

BACKGROUND OF THE INVENTION

Some automotive vehicle having seat assemblies with side impact airbags. The air bag is mounted to a seat back frame encased in a flexible sewn trim cover and a foam pad. Typically, the air bag must deploy through a sewn-seam in the trim cover or a weakened frangible area in the trim cover. It remains desirable to provide an improved trim cover design that facilitates deployment of the air bag through the trim cover.

SUMMARY OF THE INVENTION

According to one aspect of the invention, a seat assembly is provided for supporting an occupant in a passenger compartment of an automotive vehicle. The seat assembly includes a seat back for supporting the back of the occupant. The seat back includes an airbag module, a frame, a trim cover and a plurality of straps connecting the trim cover to the frame. The airbag module has an inflatable airbag. The trim cover covers the airbag module, foam pad and frame. The trim cover has a first seam through which the airbag can deploy during operation of the airbag module. The trim cover has a second seam spaced apart from the first seam. The plurality of straps prevent stretching of the trim cover during deployment of the airbag and direct the energy associated with the deployment of the airbag toward the first seam. A first strap and a second strap of tie plurality of straps each have a first end fixedly secured to the trim cover along the first seam and a second end fixedly secured to the frame. The airbag module is disposed between the first strap and the second strap. A third strap of the plurality of straps has a first end fixedly secured to the trim cover along the second seam and a second end fixedly secured to the frame.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
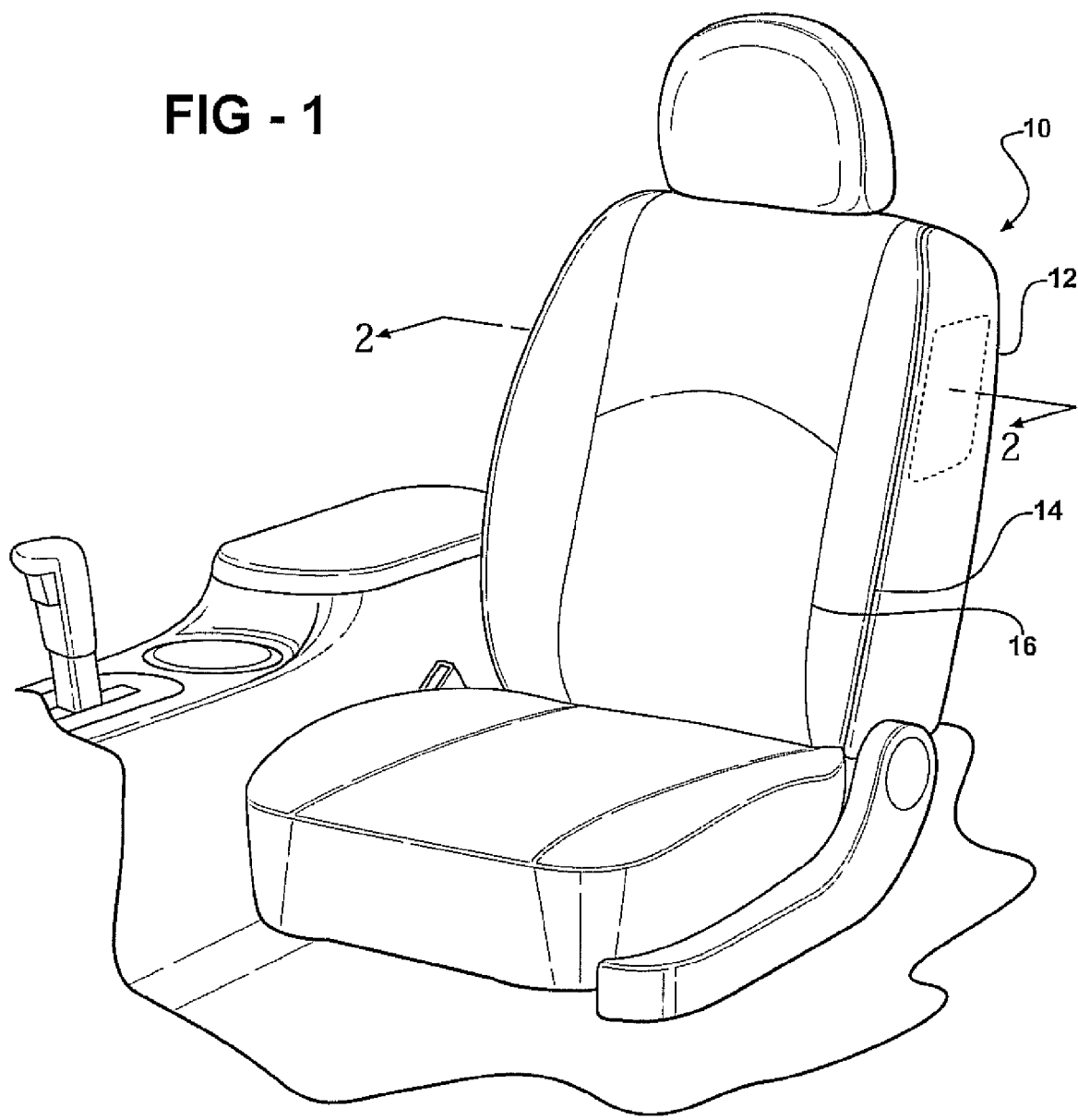
FIG. 1 is a perspective view of a seat assembly according to one embodiment of the invention.

Referring to FIG. 1, a seat assembly for an automotive vehicle is generally indicated at 10. The seat assembly 10 includes a seat back 12 for supporting the back of an occupant seated thereon. The seat assembly 10 also includes a side impact airbag module disposed within the seat back 12. The seat back 12 includes a trim cover 13 having a first seam 14 and a second seam 16. Described in greater detail below, straps are fixedly secured to the trim cover 13 to facilitate deployment of an inflatable airbag from the airbag module through the seam 14.

Figure 2:
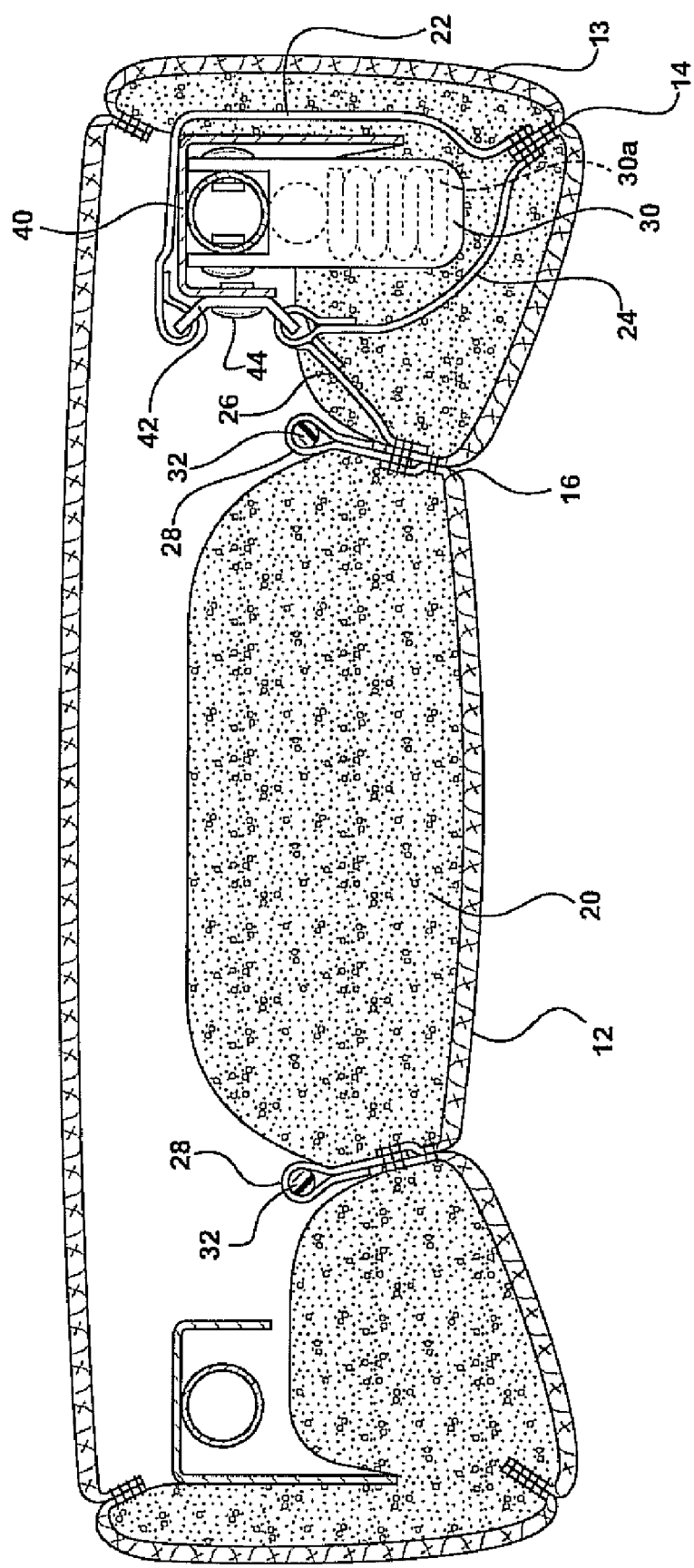
FIG. 2 is a cross sectional view of the seat assembly taken through the plane indicated at 2-2 in FIG. 1.

Referring to FIG. 2, the seat back 12 includes a foam pad 20 supported by a rigid frame 40 and an airbag module 30 fixedly secured to the frame 40. The frame 40 may be formed from any conventional materials using any conventional forming process. For example, the frame 40 may be formed as a stamped member, a bent tube member, or as a combination thereof as illustrated. The pad 20, airbag module 30 and frame 40 are encased in the trim cover 13. The trim cover 13 may be formed from any conventional materials known by those having ordinary skill in the art, such as leather, textile, vinyl or any combination thereof.

The airbag module 30 is positioned within the seat back 12 for deployment of the inflatable airbag 30a through the first seam 14 in the trim cover 13. As illustrated, the first seam 14 may be formed by sewing along adjacent edges of two adjoining panels of the trim cover 13. Alternatively, the first seam 14 may be formed by weakening or thinning an area of the trim cover 13 in the vicinity of the airbag module 30. The trim cover 13 includes a first strap 22 having a first end sewn to the trim cover 13 along the first seam 14. The trim cover 13 includes a second strap 24 having a first end sewn to the trim cover 13 along tie first seam 14. The trim cover 13 also includes a third strap 26 having a first end sewn to the trim cover 13 along the second seam 16. Each of the straps 22, 24, 26 includes a second end fixedly secured to the frame 40 by a bracket 42. The bracket 42 can be coupled to tie frame 40 by any conventional attachment method, such as by welding or using a bolt screw, rivet and the like. Each of the straps 22, 24, 26 may be formed from a woven nylon material or other similar materials having a substantially higher tensile strength than the trim cover material.

In the illustrated embodiment, the first ends of the straps 22, 24, 26 are directly sewn to the trim cover along the seams 14, 16. Other attachment methods may be used for securing the first ends of the straps to the trim cover, such as sewing J-shaped extruded strips thereto and interlocking the strips together. Further, the second ends of the straps 22, 24, 26 are illustrated with sewn-in loops that extend through an opening formed in the bracket 42. Other attachment methods may, however, be used for securing the second ends of the straps to the bracket or frame, such as sewing a J-shaped extruded strip to the strap and securing the strip to the bracket or frame, or hog-ringing the strap to the bracket, frame or a bent-wire member welded to the frame. Alternatively, the second and third straps may be formed from a single strap with opposite ends fixedly secured to respective seams 14, 16 and a sewn-in loop for fixedly securing the integrated strap to the bracket 42.

The second seam 16 includes a sewn-in loop 28 that extends substantially along the length of the seam 16. An elastic tether 32 extends through the loop 28 and is fixedly secured to the frame 40 for pulling the second seam 16 of the trim cover 13 toward the frame. The second seam 16 may be coupled to the frame 40 by other methods, such as by inserting a wire through the loop 28 and securing the wire to the frame 40 with hogrings or other suitable fasteners.

During deployment of the airbag module 30, the airbag 30a is inflated and expands outwardly relative to the frame 40. The expansion of the airbag 30a creates tension in the trim cover 13 and the straps 22, 24, 26. Stretching of the trim cover 13 is, however, limited due to the substantially higher tensile strength of the straps 22, 24, 26. The energy associated with the expansion of the airbag 30a is directed toward the first seam 14 between the first 22 and second 24 straps rather than toward stretching of the trim cover 13. The third strap 26 further resists stretching of the trim cover 13, particularly along portions of the trim cover 13 adjacent to the second seam 16. Thus, the first 22, second 24 and third 26 straps facilitate the deployment of the airbag 30$a$ through the first seam 14 by preventing stretching of the trim cover 13 due to expansion of the airbag 30$a$ and by directing the energy associated with the expanding airbag 30$a$ toward the first seam 14.

The invention has been described in an illustrative manner. It is, therefore, to be understood that the terminology used is intended to be in the nature of words of description rather than of limitation. Many modifications and variations of the invention are possible in light of the above teachings. For example, the seat assembly may utilize any type and specification of side impact airbag module known by those having ordinary skill in the art. Further, the thicknesses and lengths of the straps may differ in proportion than as shown in the illustrated embodiments depending on the type and specification of the side impact airbag module used. Thus, within the scope of the appended claims, the invention may be practiced other than as specifically described.

I claim

1. A seat assembly for supporting an occupant in a passenger compartment of an automotive vehicle, said seat assembly comprising:
   a seat back for supporting the back of the occupant, the seat back comprising:
   an airbag module having an inflatable airbag;
   a foam pad;
   a frame supporting the airbag module and the foam pad;
   a bracket attached to the frame;
   a trim cover covering the airbag module, foam pad and frame, the trim cover having a first seam through which the airbag can deploy during operation of the airbag module, the trim cover having a second seam spaced apart from the first seam;
   a plurality of straps interconnecting the trim cover to the frame to prevent stretching of the trim cover during deployment of the airbag and to direct the energy associated with the deployment of the airbag toward the first seam, a first strap of the plurality of straps having a first end fixedly secured to the trim cover along one side of the first seam and a second strap of the plurality of straps having a first end fixedly secured to the trim cover along an opposite side of the first seam, the airbag module being disposed and operable to deploy between the first strap and the second strap and through the first seam, and a third strap of the plurality of straps having a first end fixedly secured to the trim cover along the second seam;
   wherein the first strap, the second strap and the third strap each have a second end fixedly secured to the bracket.

2. A seat assembly as set forth in claim 1, wherein the second strap is positioned between the first strap and the third strap.

3. A seat assembly as set forth in claim 1, wherein a longitudinally extending loop is formed along the second seam.

4. A seat assembly as set forth in claim 3 including a tether extending through the loop along the second seam, the tether being coupled to the frame to maintain the position of the second seam relative to the frame.

5. A seat assembly as set forth in claim 4, wherein the tether is elastic.

6. A seat assembly as set forth in claim 5, wherein the third strap is disposed between the loop along the second seam and the second strap to limit stretching of the trim cover and tether during deployment of the airbag.

7. A seat assembly as set forth in claim 1, wherein the first ends of the first strap and of the second strap are sewn to the trim cover along the first seam.

8. A seat assembly as set forth in claim 7, wherein the first end of the third strap is sewn to the trim cover along the second seam.

9. A seat assembly as set forth in claim 8, wherein the second end of each strap is fixedly secured to the frame by a single bracket, the second end of each strap having a closed loop that extends through a hole formed in the bracket.

10. A seat assembly as set forth in claim 9, wherein each of the plurality of straps is made of nylon.

* * * * *

UNITED STATES PATENT AND TRADEMARK OFFICE
CERTIFICATE OF CORRECTION

PATENT NO.         : 7,677,594 B2                             Page 1 of 1
APPLICATION NO.    : 11/771508
DATED              : March 16, 2010
INVENTOR(S)        : Robert Joseph Hazlewood et al.

It is certified that error appears in the above-identified patent and that said Letters Patent is hereby corrected as shown below:

Column 1, line 40 replace "tie" with --the--

Column 2, line 25 replace "tie" with --the--

Column 2, line 29 replace "tie" with --the--

Signed and Sealed this

Twenty-ninth Day of June, 2010

David J. Kappos
*Director of the United States Patent and Trademark Office*